United States Patent [19]
Ohmi

[11] Patent Number: 5,602,323
[45] Date of Patent: Feb. 11, 1997

[54] METHOD OF MANUFACTURING REFERENCE SAMPLES FOR CALIBRATING AMOUNT OF MEASURED DISPLACEMENT AND REFERENCE SAMPLE, AND MEASURING INSTRUMENT AND CALIBRATION METHOD

[76] Inventor: Tadahiro Ohmi, 1-17-301, Komegabukuro 2-chome, Aoba-ku, Sendai-shi, Miyagi-ken 980, Japan

[21] Appl. No.: 256,613

[22] PCT Filed: Jan. 21, 1993

[86] PCT No.: PCT/JP93/00075

§ 371 Date: Jul. 18, 1994

§ 102(e) Date: Jul. 18, 1994

[87] PCT Pub. No.: WO93/14377

PCT Pub. Date: Jul. 22, 1993

[30] Foreign Application Priority Data

Jan. 21, 1992 [JP] Japan ..................... 4-030062

[51] Int. Cl.$^6$ ........................... H01L 21/465
[52] U.S. Cl. ................... 73/1 J; 216/24; 216/99
[58] Field of Search .................. 73/1 J, 105, 1 R; 156/657, 659

[56] References Cited

U.S. PATENT DOCUMENTS

| | | | |
|---|---|---|---|
| 2,715,830 | 8/1955 | Lewis et al. | 73/105 |
| 3,505,861 | 4/1970 | Schoefer et al. | 73/1 R |
| 4,851,671 | 7/1989 | Pohl. | |
| 5,030,319 | 7/1991 | Nishino et al. | 156/635 |
| 5,166,100 | 11/1992 | Gossard et al. | 437/228 |

FOREIGN PATENT DOCUMENTS

| | | |
|---|---|---|
| 1-267401 | 10/1989 | Japan. |
| 4-28887 | 1/1992 | Japan. |

*Primary Examiner*—Robert Raevis
*Attorney, Agent, or Firm*—Baker & Daniels

[57] ABSTRACT

An object to the present invention is to provide a reference sample for easily and accurately calibrating a region of recesses and projections of several to ten angstroms for the observation of which an inter-atom force microscope displays its performance. The method manufacturing reference samples according to the present invention, wherein an object to be measured and a probe are placed in an opposed state with a minute clearance left between the surface of the former and a free end of the latter. The etching is carried out with an etching agent of an extremely low etching speed to accurately control the speed of etching a stepped portion of a pattern.

8 Claims, 5 Drawing Sheets

Process 1

Process 2

Process 3

Process 4
Process 5

Process 6
Process 7

Process 8

METHOD OF MANUFACTURING REFERENCE SAMPLES FOR CALIBRATING AMOUNT OF MEASURED DISPLACEMENT AND REFERENCE SAMPLE, AND MEASURING INSTRUMENT AND CALIBRATION METHOD

FIELD OF THE INVENTION

The present invention relates to a manufacturing method for reference samples for calibrating an amount of measured displacement, as well as to a reference sample, a measuring instrument, and a calibration method. In greater detail, the present invention relates to a manufacturing method for a reference sample which is capable of calibrating an amount of displacement resolvable by means of an inter-atom force microscope, to a level of 10Å or less, as well as to this reference sample, a calibration method using this reference sample, and a measuring instrument for calibration.

BACKGROUND ART

Conventionally, the following technologies have been known as inter-atom force microscopes.

In such technologies, when scanning is conducted while causing a probe and a sample surface to approach one another, the very small inter-atomic forces operating between the atoms constituting the probe and the atoms constituting the surface of the sample are detected, and thereby, it is possible to observe with high resolution the extremely fine surface topography on a metal sample or an insulator sample.

The operating principle of the inter-atom force microscope is as follows.

In FIG. 6, reference numeral 601 indicates a probe having an overall size on the level of a few microns and having a pointed lead end; this probe comprises a material such as, for example, silicon nitride or the like. This probe 601 is formed integrally with a thin spring 602. Reference numeral 603 indicates a sample; such samples include metals, insulators, semiconductors, or the like. The forces operating between probe 601 and sample 603 vary as shown in the graph of FIG. 7 when the distance therebetween is altered. Here, the X-axis indicates the distance between probe 601 and sample 603, and taking the point at which this force is 0 as the origin, the direction in which the probe moves away from sample 603 is the positive direction. The Y-axis indicates the force operating between probe 601 and sample 603; the positive direction indicates a repulsive force, while the negative direction indicates an attractive force. An attractive force operates between the probe 601 and the sample 603 as they approach one another at a point at which the extreme surfaces thereof are at a distance of less than approximately 100Å, and a repulsive force operates therebetween when this distance is reduced to a few Å. The size of the force is within a range of approximately $10^{-7}$ to $10^{-12}$ N. The repulsive force is converted to a displacement by means of a weak spring (10 N/m–0.01 N/m), and by means of this, the force operating between the probe 601 and the sample 603 can be determined.

There are cases in which an optical lever is employed as a method for detecting the displacement of the spring. A conceptual diagram showing the case in which an apparatus is constructed in this manner is shown in FIG. 8. The sample can be moved slightly and independently in each of the X, Y, and Z directions using piezoelectric elements 801 in the XYZ scanning system. The displacement detection system comprises a laser source 802 and a laser detector 803; these are disposed so that the laser beam reflected at the upper surface of the spring 805 which is formed integrally with the probe 804 is incidented into the laser detector 803. When a displacement is produced in spring 805 as a result of the force operating between probe 804 and sample 806, a change is produced in the path of the reflected laser in accordance with the displacement, and this displacement thus alters the amount of light which is incidented into laser detector 803, and the displacement is thus detected. In order to detect the changes in the extremely fine recesses and projections on the surface of sample 806 by means of probe 804 when scanning sample 806 in the X and Y directions, a method is often employed in which the displacement of the spring 805 is not directly measured, but rather, the sample 806 is moved in the Z direction in accordance with the recesses and projections thereon so that the displacement maintains a constant value, and the data relating to the recesses and projections is obtained from the piezo control voltage at that time.

The following methods are commonly employed as methods which permit the estimation of the amount of recesses and projections measured by means of this microscope.
1) Calibration is conducted by means of a grating pattern having recesses and projections on the level of from 1,000Å to a few 100Å, from the limit in accordance with the manufacturing method of the stepped portion of the pattern and the measurement limit of another measurement apparatus when used on this stepped portion.
2) The relationship between the voltage applied to the piezoelectric elements and the displacement is estimated in advance by means of an optical mechanism.
3) A sample, the shape and degree of recesses and projections whereof is determined in advance by means of cross sectional TEM or the like is measured, and this is coordinated with the size of the recesses and projections, insofar as this produces no inconsistencies.

However, in the conventional technologies described above, the following problems were present.

The resolution of this instrument was far superior to that of other instruments, so that in the region in which the instrument was best capable of exhibiting its abilities, a region from a few tens of angstroms to a few angstroms or less, there was no other measurement mechanism capable of accurately calibrating the amount of recesses end projections.

In greater detail, with respect to 1), 2), and 3) described above, 1) when an attempt was made to estimate the recesses and projections on a level of 10Å or less, at which level the inter-atom force microscope exhibited its abilities, the values calibrated by means of method 1) above were interpolated to values of 10Å or less in an unchanged manner, and this is extremely dangerous, and is likely to produce conflicting values as a result of the characteristics of the instrument.

Method 2) above was effective for the calibration of the piezoelectric elements themselves; however, it is doubtful that these values will strictly correspond to the values obtained when the piezoelectric elements are built into an instrument as an inter-atom force microscope. Furthermore, such a calibration method requires a considerable level of technology, so that it is not a method which can be easily employed by a user at the site at which measurement is conducted.

The method of 3) is serviceable as a method for approximate calculation; however, the possibility of quantitive estimation using this method is poor.

The present invention has as an object thereof to provide a reference sample for the easy and accurate calibration of a region of recesses and projections within a range of a few tens of angstroms to a few angstroms, in which range an inter-atom force microscope displays superior performance.

SUMMARY OF THE INVENTION

The manufacturing method for reference samples for calibrating an inter-atom force microscope in accordance with the present invention is characterized in obtaining a desired stepped portion of a pattern while accurately controlling a rate of etching via a pattern mask by means of an etching agent having an extremely low etching speed.

In the present invention, it is possible to provide a stepped portion of a pattern which is accurately measured within a range of from a few angstroms to a few tens of angstroms by means of a comparatively simple manufacturing method, so that it is possible to conduct extremely reliable calibration by means of measuring such a sample. Furthermore, the present invention is not limited to the calibration of inter-atom force microscopes but may also be employed in the calibration of other instruments which are capable of measuring similar samples.

Figure 1A:
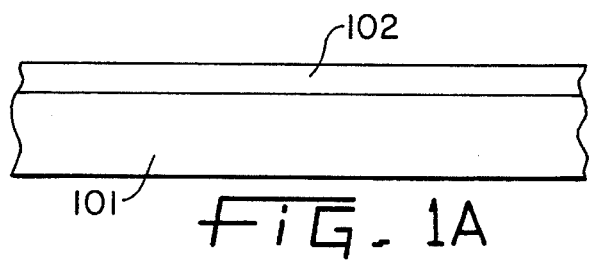
FIG. 1 is a manufacturing process diagram showing a reference sample in accordance with an embodiment.
Figure 1B:
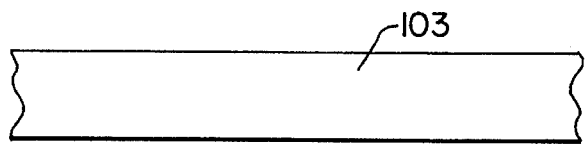
Figure 1C:
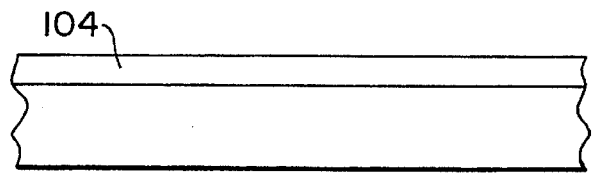
Figure 1D:
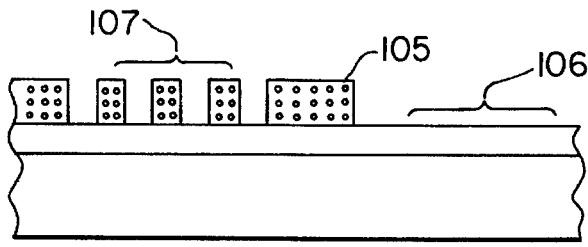
Figure 1E:
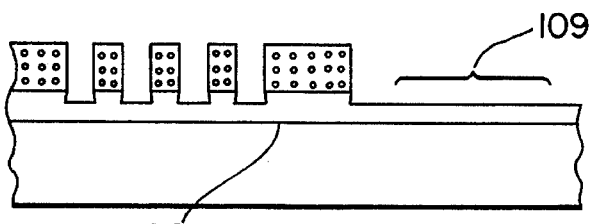
Figure 1F:
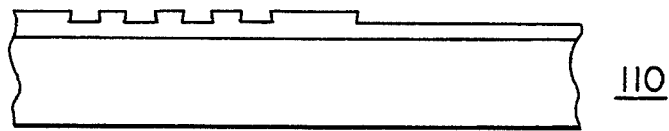

DESCRIPTION OF THE REFERENCE NUMERALS 101 silicon wafer
102 sacrificial oxide film
103 silicon wafer after removal of sacrificial oxide film
104 thermal oxide film
105 resist mask
106 surface area
107 stepped portion of the pattern used in calibration
108 oxide film which has been stepped
110 reference sample
601 probe
602 spring
603 sample
801 piezoelectric element
802 laser source
803 laser detector
804 probe
805 spring
806 sample

BEST MODE FOR CARRYING OUT THE INVENTION

Embodiment 1

The manufacturing processes of the manufacturing method will be explained hereinbelow as an embodiment of the present invention. A sample is prepared having a surface which is sufficiently level in comparison with the size of the steps which are to be calibrated. Furthermore, the processes are selected and controlled so that the surface of the sample is not roughened during the manufacturing processes. In the present embodiment, a silicon wafer was employed as the sample.

Process 1: sacrificial oxidation: pyrogenic oxidation at a temperature of 1000° C. and for a period of 4 hours Process 2: removal of sacrificial oxide film: immersion for a period of 13 minutes in buffered hydrofluoric acid having a surfactant added thereto.

Process 3: thermal oxide film formation: oxidation in dry oxygen at a temperature of 1050° C. and for a period of 1 hour and 25 minutes.

Process 4: a patterning process by means of photolithography

Process 5: measurement of the initial value of oxide film thickness by means of ellipsometry Process 6: etching of the stepped portion of the pattern by means of an etching agent having an extremely low etching speed Immersion for a predetermined period of time in a mixed solution of ammonium fluoride solution and aqueous ammonia Process 7: measurement of oxide film thickness by means of ellipsometry Process 8: removal of resist mask The processes described above are shown in FIG. 1.

Process 1 serves the purpose of further smoothing the surface of the sample. Reference numeral 101 indicates a silicon wafer which comprises the sample, while reference numeral 102 indicates a sacrificial oxide film which is formed thereon in process 1. If a sample having a sufficiently smooth surface can be prepared, it is possible to omit Processes 1 and 2. Furthermore, Processes 1 and 2 may be repeated until a sufficiently smooth sample is obtained, insofar as the effects thereof continue.

In Process 2, the sacrificial oxide film is removed; however, any etching agent may be used in this process insofar as the surface of the silicon is not rougher than the required range when the removal of the oxide film is completed.

In Process 3, a thermal oxide film 104 is formed in order to produce stepping. Reference numeral 103 indicates the silicon wafer after the removal of the sacrificial oxide film. In the present embodiment, the thickness of the thermal oxide film 104, which provides accuracy in the measurement of film thickness in Processes 5 and 7, is 1000Å.

In Process 4, a pattern mask 105 is applied by means of a resist as an etching mask which is necessary for the patterning of the stepped portion. This mask may be formed by any method, insofar as an appropriate mask can be applied. Furthermore, the area 106, in which the surface of the oxide film is completely exposed so as to permit measurement of oxide film thickness in Processes 5 and 7, must have a certain pattern. Reference numeral 107 indicates the stepped portion of the pattern which is used in calibration.

In Process 5, the measurement of the initial thickness of the oxide film is conducted; however, any method may be conducted for this measurement insofar as the method provides sufficient reliability.

In Process 6, the etching of the oxide film is conducted. Reference numeral 108 indicates the oxide film which has been subjected to stepping by means of etching. The etching period which is employed is the etching period which is necessary in order to obtain stepping of the desired size. This period may be easily determined if the etching speed of the etching agent is measured in advance. The smaller the desired size of the stepping, the lower the etching speed of the etching agent which must be prepared.

It is possible to adjust the etching speed by means of altering the mixing ratio of the ammonium fluoride solution and the aqueous ammonia. At this time, the ammonium fluoride solution which is used should be refined so that the concentration of free hydrofluoric acid is less than or equal to 0.1%. Such refining is important, as the concentration of free hydrofluoric acid contributes to the etching speed.

Figure 2:
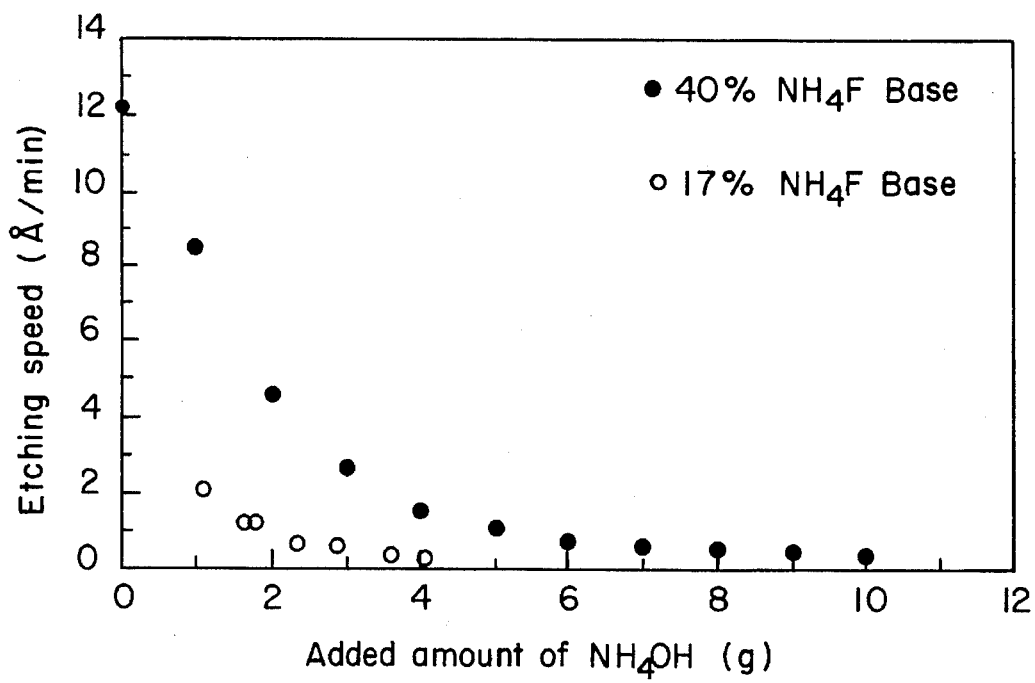
FIG. 2 is a graph showing the relationship between the etching agent and the etching speed.

In FIG. 2, the etching speeds are shown in the cases in which the amount of the 28% aqueous ammonia which is added to 40% and 17% ammonium fluoride solutions, respectively, is altered. It is possible to predict etching speeds from this graph. In the present embodiment, the base was adjusted to 17% ammonium fluoride, and this was adjusted to a speed of 1.35Å per minute. It is possible to adjust this to lower etching speeds.

In Process 7, as in Process 5, the thickness of the oxide film at the same portion 109 after etching is measured. The size of the stepped pattern formed on the oxide film is determined from the difference between the thickness of the oxide film as measured in Process 6 and the film thickness as measured in the present Process. Even in cases in which the desired value of the stepping is excessively small and it is impossible to obtain a reliable difference by measurement, if an etching agent is used which has a sufficiently low etching speed, etching is conducted for an etching period in which the film thickness can be sufficiently etched in advance, and the etching speed thus determined, it is possible to determine by calculation the etching period of the sample which will provide the desired etching rate, and to obtain an accurate etching rate.

The removal of the resist is conducted in Process 8. Reference numeral 110 indicates the reference sample after the removal of the resist.

FIG. 3 shows examples of images obtained by the observation of the stepped portion of the pattern of reference samples produced by means of the processes described above, as observed by an inter-atom force microscope. Reference numeral 301 indicates an example in which the stepped portion measures 54Å, reference numeral 302 shows an example in which the stepped portion measures 27.5Å, reference numeral 303 indicates an example in which the stepped portion measures 13Å, and reference numeral 304 indicates an example in which the stepped portion measures 7.5Å.

Figure 4:
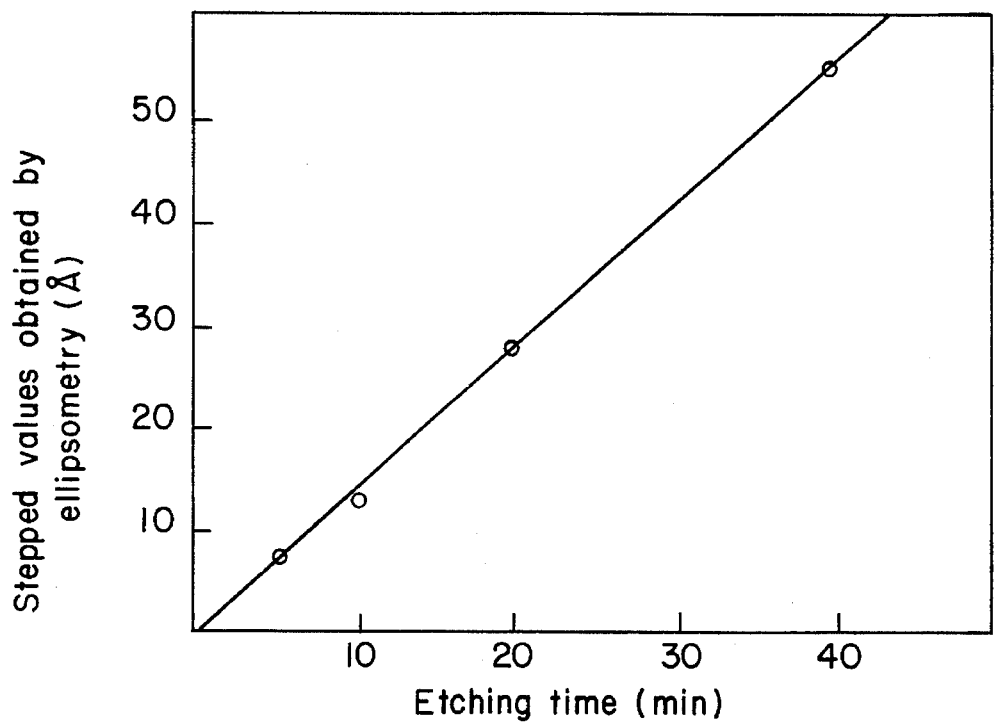
FIG. 4 is a graph showing the relationship between the time required for the etching of a group of reference samples and the stepped values obtained by ellipsometry.
Figure 3A:
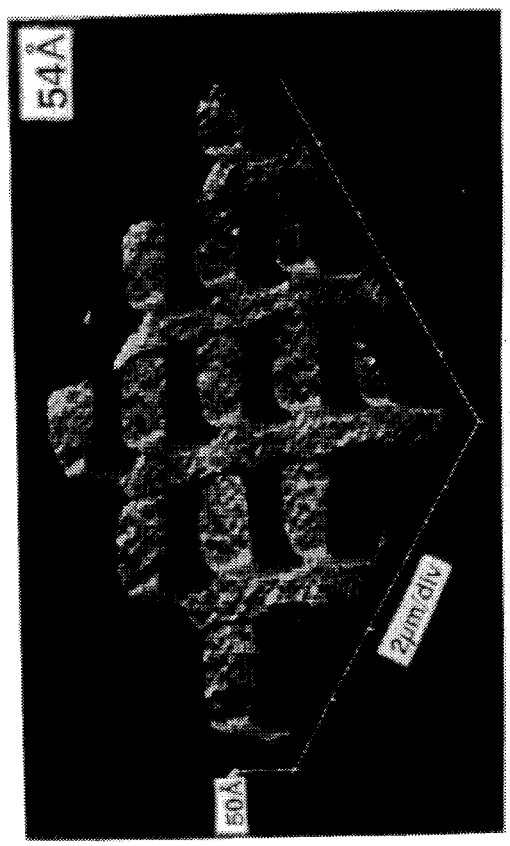
FIG. 3 shows images obtained by the observation of a stepped portion of a pattern of a reference sample in accordance with an embodiment, as observed by an inter-atom force microscope.
Figure 3B:
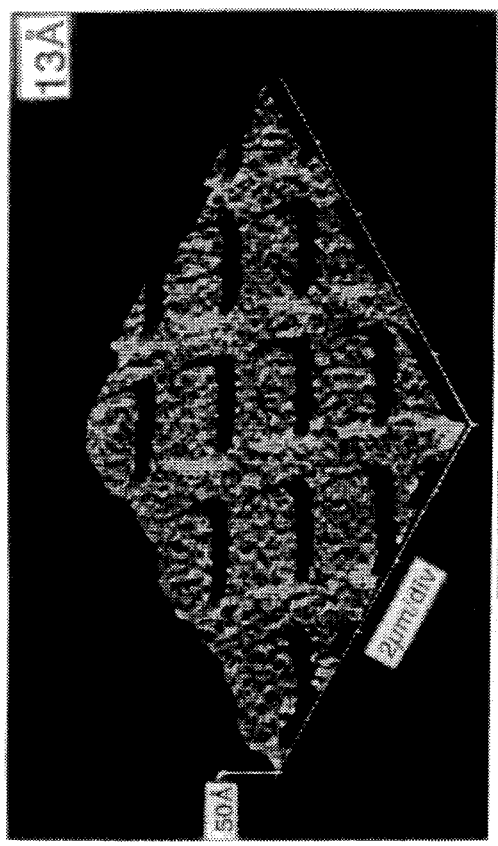
Figure 3C:
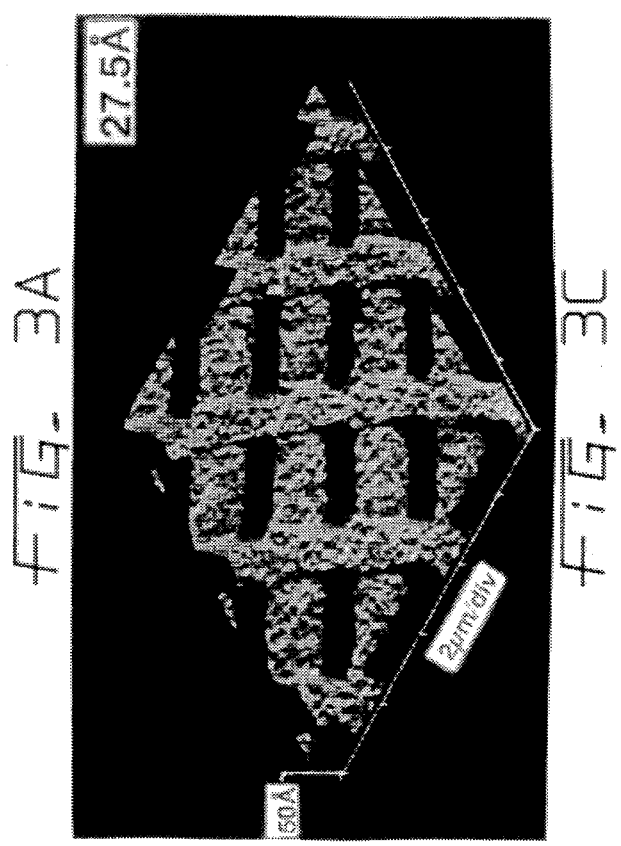
Figure 3D:
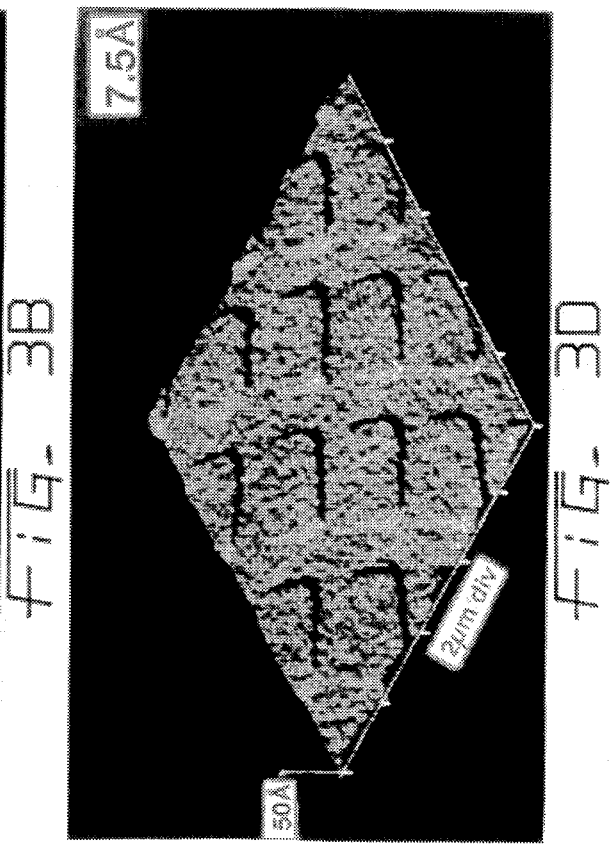

In FIG. 4, a graph is shown which indicates the time required for the etching of this group of reference samples, and the values of the stepped portions as obtained by ellipsometry. The etching period and the value of the stepped portion are in a proportional relationship, so that even at stepped portions of less than or equal to 7.5Å, at which values measurement is very likely to be difficult, if the etching period is further reduced to 4 minutes or 3 minutes, it will be possible to obtain even smaller stepped portions with good accuracy.

In order to obtain this type of straight-line relationship with respect to time, it is necessary to control the temperature of the etching tank at a constant level, to conduct etching in a sealed vessel, and to prevent the vaporization of ammonia and the release thereof from the solution. The reason for this is that hydrogen fluoride separates from ammonia fluoride and raises the etching speed in an undesirable manner.

Figure 5:
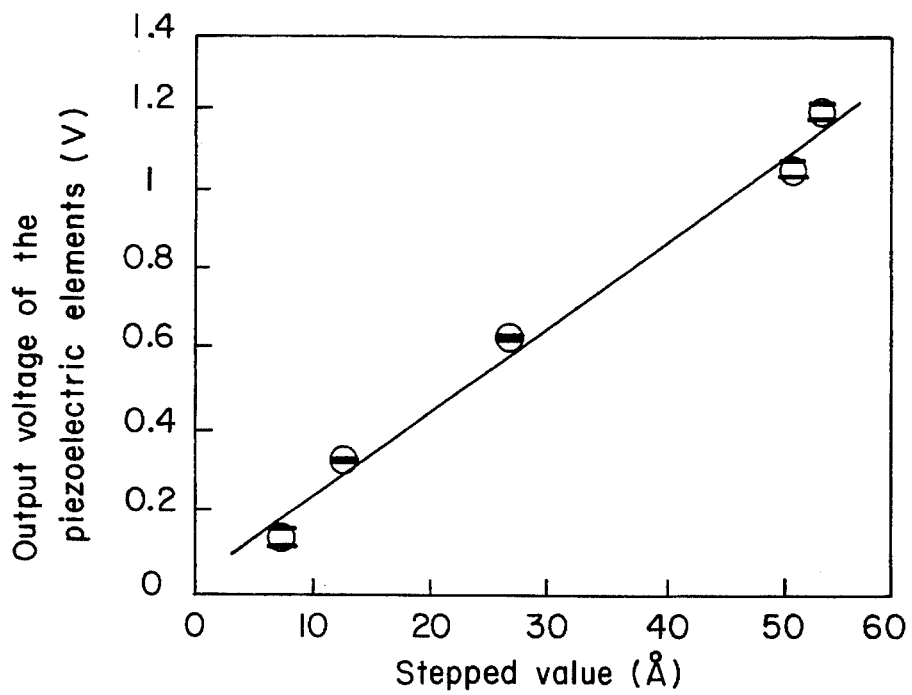
FIG. 5 is a graph showing the relationship between the output voltage of the piezoelectric elements during the measurement of the group of samples using an inter-atom force microscope, and the stepped portion of the pattern.
Figure 6:
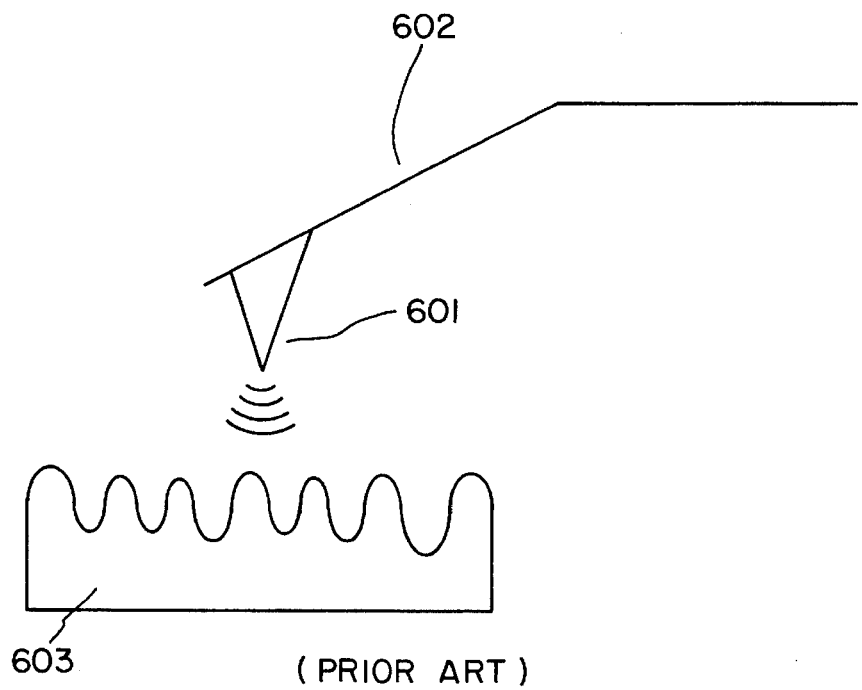
FIG. 6 is a conceptual diagram for explaining the measurement principle of the inter-atom force microscope.
Figure 7:
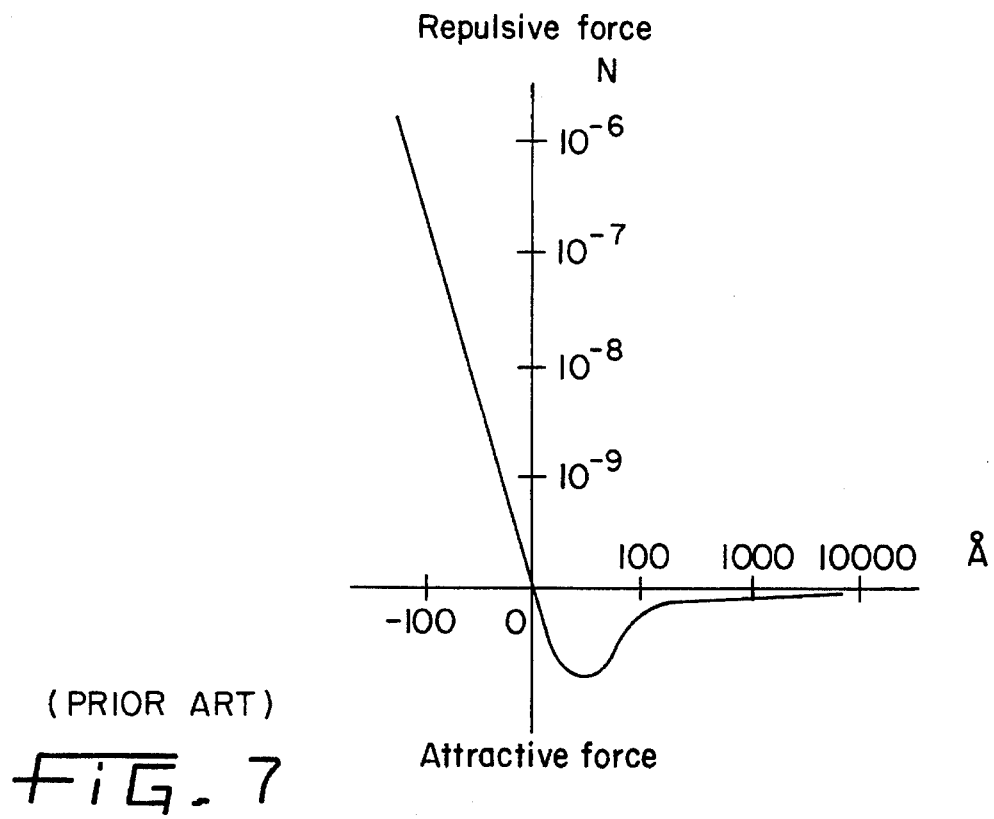
FIG. 7 is a graph showing the relationship between the force operating between the probe and the sample in an inter-atom force microscope, and the distance therebetween.
Figure 8:
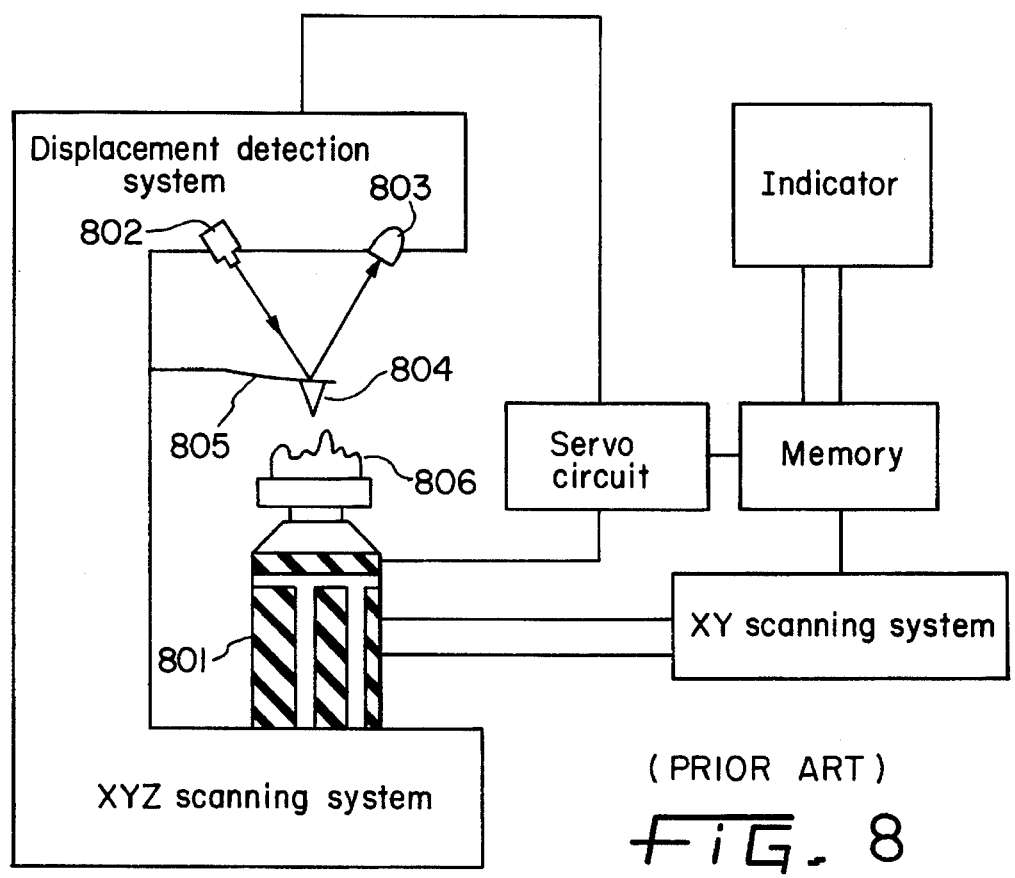
FIG. 8 is a system diagram showing a system for measuring the displacement of the spring.

In FIG. 5, a graph is shown which depicts the relationship between the output voltage of the piezoelectric elements during the measurement of the group of samples using an inter-atom force microscope and the stepped portion of the pattern. A piezoelectric element sensitivity of 42Å/Volt is obtained which is in a very clear proportional relationship, and it is thus clear that the calibration, by means of the stepped portion of the pattern, of the inter-atom force microscope can be completed with good results.

Embodiment 2

In this Example, the inter-atom force microscope which was calibrated was accomplished in Embodiment 1 is replaced by a measuring instrument.

Embodiment 3

Using an inter-atom force microscope, the calibration of which was accomplished in Embodiment 1, a silicon wafer having a certain surface roughness was measured, and this surface roughness was found to have a center line average roughness of 4.9Å. The same sample may be used as a reference sample having a surface roughness of a center line average roughness of 4.9Å, and in this case, this is an Embodiment of the reference sample. Furthermore, a sample having a stepped pattern thereon may be measured in the same manner and used as a reference stepped portion.

Embodiment 4

The natural oxide film on the surface of a sample as described in Embodiment 3 was removed using dilute hydrofluoric acid, and the center line average roughness of this sample was measured by means of a scanning tunneling microscope, and this value was found to be 7.5Å. As described in Embodiment 3, the measured reference sample should possess a central line average roughness of 4.9Å, so that the sensitivity of the piezoelectric elements of the scanning tunneling microscope was corrected by 0.65 times (4.9/7.5). By means of the above, the present Embodiment is one in which a scanning tunneling microscope is employed as the measurement apparatus.

INDUSTRIAL APPLICABILITY

In the present invention, it is possible to provide a stepped portion of a pattern which is accurately measured within a range of from a few angstroms to a few tens of angstroms, by means of a comparatively simple manufacturing method, so that by measuring such a sample, it is possible to conduct extremely reliable calibration.

Furthermore, such calibration is not limited to inter-atom force microscopes, but may be used for other instruments which are capable of measuring such a sample.

I claim:

1. A method of manufacturing a reference sample for use in calibrating displacement measurements of an inter-atom force microscope, said reference sample including a predetermined amount of displacement, said displacement measurements being measured by means of an inter-atom force microscope having a probe with a lead end and wherein a surface of a sample to be measured and the lead end of the probe are placed in opposition with a very small gap therebetween, whereby a force operating between atoms constituting said sample to be measured and said probe is converted into a mechanical displacement, said method comprising the step of etching a stepped portion of a pattern in said reference sample, in a sealed vessel, while accurately controlling the speed of etching said stepped portion of a pattern and wherein an etching agent is used which has an extremely low etching speed and comprises aqueous ammonia which has been added to an ammonium fluoride solution whereby a concentration of free hydrogen fluoride is adjusted to a low level.

2. The method in accordance with claim 1, wherein said etching is conducted with an etching agent which includes etching reactants of predetermined concentrations and wherein said concentrations of the etching reactants are adjusted so as to be sufficiently low, so that the etching speed enables producing said stepped portion of a pattern to a level of 10Å or less.

3. The method in accordance with claim 1 wherein said stepped portion of a pattern comprises a thermal oxide film located on a silicon wafer.

4. The method in accordance with claim 3 wherein the etching speed for etching the oxide film is determined by measuring the film thickness of said oxide film.

5. A calibration method for calibrating an inter-atom force microscope by using a reference sample produced by means of a manufacturing method in accordance with claim 1.

6. An inter-atom force microscope for conducting calibration, said microscope including a reference sample, said reference sample produced by means of the manufacturing method in accordance with claim 1.

7. A reference sample for calibrating an inter-atom force microscope, said reference sample produced by means of the method of claim 1.

8. A calibration method for calibrating an inter-atom force microscope, said microscope including a reference sample defined in claim 7.

* * * * *